United States Patent
Kwak et al.

(10) Patent No.: US 7,643,844 B2
(45) Date of Patent: Jan. 5, 2010

(54) METHOD OF MANAGING RADIO RESOURCES AND NODE B APPARATUS IMPLEMENTING THE SAME

(75) Inventors: No-Jun Kwak, Seoul (KR); Ju-Ho Lee, Suwon-si (KR); Gert Jan Van Lieshout, Middlesex (GB); Kook-Heui Lee, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 561 days.

(21) Appl. No.: 11/393,844

(22) Filed: Mar. 31, 2006

(65) Prior Publication Data

US 2006/0223567 A1    Oct. 5, 2006

(30) Foreign Application Priority Data

Mar. 31, 2005   (KR) ............... 10-2005-0027395

(51) Int. Cl.
H04B 7/00 (2006.01)
H04B 1/04 (2006.01)
H04Q 7/20 (2006.01)

(52) U.S. Cl. ............. 455/522; 455/69; 455/127.1

(58) Field of Classification Search ........... 455/522, 455/69, 127.1, 89; 370/335, 342
See application file for complete search history.

(56) References Cited

U.S. PATENT DOCUMENTS

| 7,321,780 B2 * | 1/2008 | Love et al. ............ 455/522 |
| 7,408,895 B2 * | 8/2008 | Zhang et al. ........... 370/318 |
| 2004/0198369 A1 | 10/2004 | Kwak et al. |
| 2005/0025100 A1 * | 2/2005 | Lee et al. ............ 370/335 |
| 2005/0249148 A1 * | 11/2005 | Nakamata et al. ........ 370/328 |
| 2006/0194546 A1 * | 8/2006 | Gunnarsson et al. ........ 455/69 |
| 2007/0049321 A1 * | 3/2007 | Usuda et al. ............ 455/522 |
| 2007/0066339 A1 * | 3/2007 | Usuda et al. ............ 455/522 |

FOREIGN PATENT DOCUMENTS

| EP | 1187370 | 3/2002 |
| JP | 11074834 | 3/1999 |
| RU | 2221340 | 10/2004 |

OTHER PUBLICATIONS

Qualcomm, "Overload Indicator Command Triggering", 3GPP TSG-RAN WG2 Meeting #45bis, Sophia Antipolis, France, Jan. 10, 2005, pp. 1-4.
"3rd Generation Partnership Project; Technical Specification Group Radio Access Network; Feasibility Study for Enhanced Uplink for UTRA FDD (Release 6)", Apr. 3, 2004, pp. 1-179, www.3gpp.org/ftp/Secs/html.
"3rd Generation Partnership Project; Technical Specification Group Radio Access Network; FDD Enhanced Uplink; Overall Description; Stage 2 (Release 6)", Mar. 24, 2005, pp. 1-29, www.3gpp.org/ftp/Specs/html.

* cited by examiner

*Primary Examiner*—Tilahun Gesesse
(74) *Attorney, Agent, or Firm*—Roylance, Abrams, Berdo and Goodman, LLP

(57) ABSTRACT

A method of managing radio resources and a Node B implementing the same are provided. If the total radio resources used in a cell exceed target radio resources signaled by an RNC, uplink rates are equally allocated to primary UEs and non-primary UEs by controlling the signal strengths of the primary and non-primary UEs.

14 Claims, 8 Drawing Sheets

METHOD OF MANAGING RADIO RESOURCES AND NODE B APPARATUS IMPLEMENTING THE SAME

PRIORITY

This application claims the benefit under 35 U.S.C. § 119 (a) of a Korean Patent Application filed in the Korean Intellectual Property Office on Mar. 31, 2005 and assigned Serial No. 2005-27395, the entire disclosure of which is hereby incorporated by reference.

BACKGROUND OF THE INVENTION

1. Field of the Invention

The present invention relates generally to a mobile communication system for transmitting packet data on an uplink. More particularly, the present invention relates to a method, in a Node B, of controlling uplink rates between primary User Equipments (UEs) for which a Node B managed cell is a serving Enhanced uplink Dedicated Channel (E-DCH) cell and non-primary UEs for which a different cell is a serving E-DCH cell.

2. Description of the Related Art

Asynchronous Wideband Code Division Multiple Access (WCDMA) communication systems use the E-DCH. The E-DCH was designed to improve the performance of packet transmission by introducing new techniques to uplink communications in the WCDMA communication systems.

The new techniques are those adapted for High Speed Downlink Packet Access (HSDPA), Adaptive Modulation and Coding (AMC), Hybrid Automatic Repeat Request (HARQ), and Node B-controlled scheduling.

FIG. 1 illustrates the basic principle of E-DCH transmission.

Referring to FIG. 1, reference numeral 100 denotes a Node B supporting E-DCH transmission and reference numerals 101 to 104 denote UEs that transmit E-DCHs. The Node B 100 evaluates the channel statuses and buffer occupancies of the UEs 101 to 104 and transmits scheduling grants to them based on the evaluation. The UEs 101 to 104 then determine their maximum allowed rates according to the scheduling grants and transmit data at or below the maximum allowed rates.

Since orthogonality is not kept among uplink signals from a plurality of UEs, the uplink signals interfere with one another. As more uplink signals are transmitted, interference with an uplink signal from a particular UE increases. The increase in interference with an uplink signal decreases the reception performance of the Node B. This problem can be solved by increasing the uplink transmit power of the UE. However, the increased transmit power interferes with other uplink signals which decreases the reception performance. Accordingly, the received power level of an uplink signal is limited to ensure reception performance. This can be explained with Rise over Thermal (RoT) defined as $$RoT = I_o/N_O \quad (1)$$

where $I_o$ denotes the received total wideband power spectral density at the Node B, such as the total quantity of uplink signals received in the Node B, and $N_o$ denotes the thermal power spectral density at the Node B. Therefore, a maximum allowed RoT represents radio resources available to the Node B for the E-DCH packet data service on the uplink. For example, a maximum allowed RoT represents radio resources such as a Received Total Wideband Power (RTWP) available to the Node B, for the E-DCH packet data service on the uplink.

FIG. 2 is a diagram illustrating a signal flow for a typical E-DCH transmission and reception procedure.

Referring to FIG. 2, reference numeral 202 denotes a UE that receives the E-DCH and reference numeral 201 denotes a serving Node B 201 for the UE 202.

In step 203, the E-DCH is established between the Node B 201 and the UE 202 by exchanging messages on dedicated transport channels. After the E-DCH setup, the UE 202 transmits scheduling information to the Node B 201 in step 204. The scheduling information includes the uplink transmit power or transmit power margin of the UE 202 from which uplink channel information can be derived, or the amount of transmission data buffered in the UE 202.

Upon receipt of scheduling information from a plurality of UEs, the Node B 202 performs Node B-controlled scheduling for the UEs based on the scheduling information in step 211.

When the Node B 201 decides to grant uplink packet transmission to the UE 202, the Node B 201 transmits scheduling assignment information to the UE 202 in step 205. In step 212, the UE 202 determines the Transport Format (TF) of the E-DCH based on the scheduling assignment information. In steps 206 and 207, the UE 202 transmits the TF information and the E-DCH to the Node B 201.

The Node B 201 checks errors in the TF information and the E-DCH in step 213. The Node B 201 transmits a Negative Acknowledgement (NACK) to the UE 202 on an Acknowledgement/Negative Acknowledgement (ACK/NACK) channel in step 208 if errors exist in either the Transport Format Combination (TFC) information or the E-DCH. If there are no errors in both the TFC information and the E-DCH, the Node B 201 transmits an ACK to the UE 202 on the ACK/NACK channel in step 208.

In the latter case, the UE 202 can transmit new information on the E-DCH since the E-DCH transmission is completed in step 207. In the former case, the UE 202 retransmits the same information on the E-DCH during a next Transmission Time Interval (TTI).

Node B-controlled scheduling is divided into two schemes: "rate scheduling" and "time and rate scheduling". The rate scheduling increases or decreases a data rate for a UE, while the time and rate scheduling controls a transmission/reception timing as well as a data rate for a UE.

In the, rate scheduling scheme, the Node B increases, keeps, or decreases the data rates of all UEs requesting the E-DCH service by a predetermined level in every scheduling interval. In a system where a UE may have a TF set allowing the data rates of 16, 32, 128, 256, 384, and 568 kbps and the Node B allocates a data rate to the UE by indicating a one-level increase, keep, or decrease, if a current maximum allowed rate is 16 kbps and the Node B commands a rate increase during the next scheduling period, the one-level higher data rate from 16 kbps (32 kbps) becomes the maximum allowed data rate.

Since the rate scheduling scheme handles scheduling for many UEs, signaling overhead will be created if the amount of signaled information is very large. Therefore, the rate scheduling scheme uses a Relative Grant (RG) as scheduling information. The Node B sends signals of +1, 0, or −1 to the UE and the UE increases, keeps, or decreases its data rate by a predetermined level according to the received value.

Despite the benefit of less information and thus decreased signaling overhead on the downlink, the rate scheduling scheme takes a long time to rapidly increase data rate. Since the RG occupies one bit, RGs are signaled to UEs on a time-multiplexed common channel at UE-specific transmission timings or using UE-specific orthogonal codes.

The time and rate scheduling scheme additionally controls the E-DCH transmission timings of UEs. The time and rate scheduling scheme schedules part of many UEs and allows for a rapid rate increase or decrease. For this purpose, scheduling information is delivered by an Absolute Grant (AG). The AG carries a maximum rate to a UE and the UE sets its maximum allowed rate to the AG.

For example, if the UE now has a maximum allowed rate of 16 kbps and a large amount of data to be transmitted from the UE exists, the Node B can allocate 568 kbps to the UE in the next scheduling period so that the UE can transmit at up to 568 kbps. The Node B must have knowledge of a maximum available rate for the UE and the maximum available rate is determined by a TF set allocated to the UE. This is called a "Node B pointer".

The time and rate scheduling requires a large amount of information to indicate an absolute rate. Therefore, when a dedicated channel is used for each UE, the transmit power of the downlink becomes high. In this context, the AG is delivered on a common channel such as a High Speed Shared Control Channel (HS-SCCH) in HSDPA and with a UE-identifier (UE-id) to indicate the UE for which the AG is destined.

The channel carrying the AG is called an Enhanced Shared Control Channel (E-SCCH). The uplink packet transmission system can reduce signaling overhead by fulfilling the delay requirements of UEs by supporting both the rate scheduling scheme and the time and rate scheduling scheme and thus using their advantages.

Now a description will be made of AG transmission on an Enhanced uplink Absolute Grant Channel (E-AGCH).

The E-AGCH is a common channel that carries an AG because every UE within a cell does not need to receive an AG during every TTI. A UE-id is allocated to the E-AGCH to identify a UE to be signaled. If the UE passes a cyclic redundancy check (CRC) using the UE-id, the UE transmits the E-DCH based on information received on the E-AGCH.

A description will be made of scheduling for Soft Handover (SHO) in a system supporting both the AG and RG.

An AG delivers a large amount of information with high power. The AG is decoded in a more complex way than the E-AGCH. Therefore, it is preferable that the UE receives an AG from one Node B. This one Node B is called a "primary Node B". The UE selects a Node B that has the best downlink as a primary Node B. That is, the SHO UE receives an AG from the primary Node B and RGs from non-primary Node Bs other than the primary Node B.

Since a non-primary Node B is not authorized to schedule the UE, it does not transmit an RG indicating "up/down/keep" to the UE all the time. Instead, the non-primary Node B indicates a rate decrease if the ratio of RoTs from the other UEs in the SHO region is high. Otherwise, the non-primary Node B does not transmit signals so that the UE can operate based on the scheduling of the primary Node B. The indication is called an "overload indicator". The overload indicator can be signaled to every UE on a dedicated channel, or on a common channel, considering downlink signaling overload.

FIG. 3 illustrates the uplink RoT of a cell in a typical SHO.

Referring to FIG. 3, the uplink RoT of a cell is the sum of an RoT 310 from noise always existent on a channel, an RoT 320 from legacy channels including DCHs and control channels, and RoTs 330, 340 and 350 from E-DCHs. Reference numeral 330 denotes an RoT from an E-DCH that can be transmitted without Node B-controlled scheduling, called "non-scheduled E-DCH". Reference numerals 340 and 350 denote RoTs from E-DCHs requiring Node B-controlled scheduling, called "scheduled E-DCHs". For example, the RoT 340 is from the E-DCHs transmitted by UEs for which the cell is a serving E-DCH cell, such as primary UEs. The RoT 350 is from the E-DCHs transmitted by UEs for a cell other than this cell which is a serving E-DCH, such as non-primary UEs. A serving E-DCH cell is defined as a cell that can transmit an AG to a UE. A cell is a serving E-DCH for its primary UEs and a non-serving cell for its non-primary UEs.

While not shown, the Node B sets a target RoT and performs scheduling such that a total RoT does not exceed the target RoT. Since the Node B cannot be directly involved in scheduling in relation to the RoTs 310, 320 and 330, the RoTs 310, 320 and 330 are not controllable by the Node B. A Node B scheduler of the Node B can manage the total RoT of the cell by controlling the RoTs 340 and 350. The RoT 340 from the primary UEs can be controlled by an AG or RG, and the RoT 350 from the non-primary UEs can be controlled by an overload indicator.

In the conventional SHO situation, it is not clear when a non-primary Node B has to transmit an overload indicator.

Accordingly, there is a need for an improved system and method for transmitting an overload indicator.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention provides a method and apparatus for equally allocating uplink rates to primary UEs and non-primary UEs by controlling the signal strengths of the primary and non-primary UEs when total radio resources used in a cell exceed target radio resources signaled by a Radio Network Controller (RNC).

According to one aspect of an exemplary embodiment of the present invention, a method is provided in which radio resources are managed between a serving uplink channel from a first UE for which a Node B is a serving Node B and a non-serving uplink channel from a second UE for which the Node B is a non-serving Node B in a mobile communication system for transmitting packet data on an enhanced uplink. In this method, the Node B receives, from a radio network controller (RNC), a target total power level and a target power ratio of the non-serving uplink. The Node B also receives a target total power level on the enhanced uplink channel. The Node B compares the target total power level with a current total power level by the Node B and compares the target power ratio with a current power ratio by the Node B. If the current power ratio is higher than the target power ratio and the current total power level is higher than the target total power level by the Node B, the Node B commands the second UEs to decrease data rate of the non-serving uplink channels.

According to another aspect of an exemplary embodiment of the present invention, a method is provided in which radio resources are managed between a serving uplink channel from a first UE for which a Node B is a serving Node B and a non-serving uplink channel from a second UE for which the Node B is a non-serving Node B in a mobile communication system for transmitting packet data on an enhanced uplink. In this method, a RNC sets a total power level. The RNC also sets a target power ratio for the non-serving uplink channels and a target total power level on the enhanced uplink. The RNC signals the target total power level and the target power ratio to the Node B by the RNC, for use in controlling a data rate of the non-serving uplink channels for the second UEs.

According to a further aspect of an exemplary embodiment of the present invention, a Node B apparatus is provided for managing radio resources between a serving uplink channel from a first UE for which a Node B is a serving Node B and a non-serving uplink channel from a second UE for which the Node B is a non-serving Node B in a mobile communication system for transmitting packet data on an enhanced uplink. In the Node B apparatus, a receiver receives, from a radio network controller (RNC), a target total power level and a target power ratio of the non-serving uplink channels, and a target total power level on an enhanced uplink. If a current total power level is higher than the target total power level and the current power ratio is higher than the target power ratio, a decider determines whether to command the second UEs to decrease data rate of the non-serving uplink channels. A transmitter commands the second UEs to decrease data rate of the non-serving uplink channels according to the determination of the decider.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 4A:
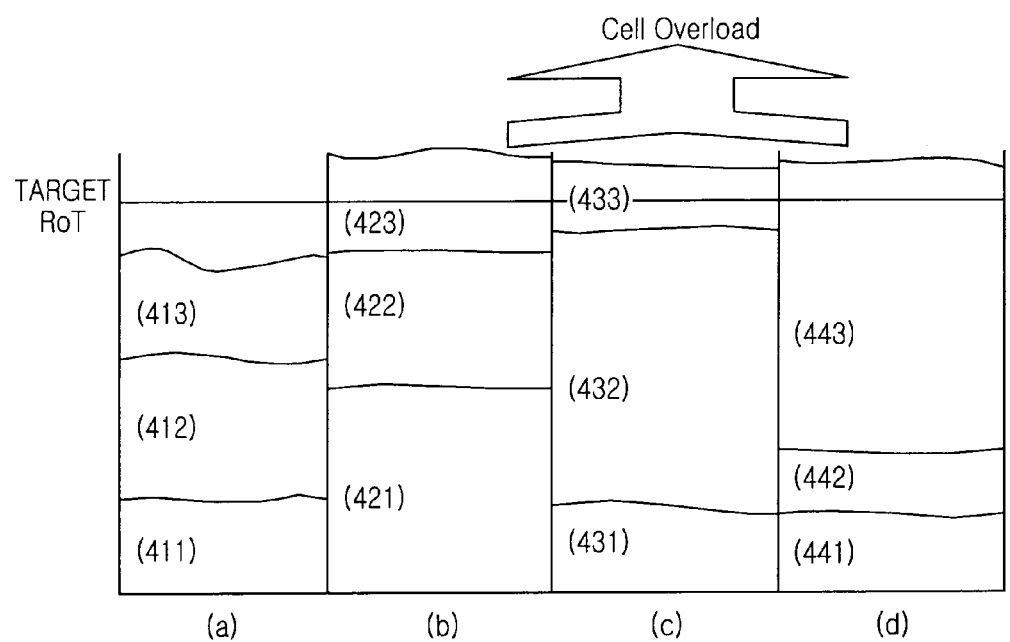
FIG. 4A illustrates cell states to which exemplary embodiments of the present invention are applied.

FIG. 4A illustrates cell states to which an exemplary embodiment of the present invention is applied. Reference numerals 411, 421, 431 and 441 denote non-controllable RoTs. Reference numerals 412, 422, 432 and 442 denote RoTs from scheduled E-DCHs received from primary UEs. Reference numerals 413, 423, 433 and 443 denote RoTs from scheduled E-DCHs received from non-primary UEs. The Node B manages the E-DCHs separately depending on whether the E-DCHs are from the primary UEs or the non-primary UEs. The E-DCHs of the primary UEs are serving E-DCHs for the Node B and the E-DCHs of the non-primary UEs are non-serving E-DCHs for the Node B.

Referring to FIG. 4A, reference character (a) denotes an overload-free state of the cell. The total RoT, such as the total received power level of the cell is the sum of the RoTs 411, 412 and 413. Because the sum is lower than a target RoT representing a target received power level of the cell, the cell is free from overload. In this case, the RoT from the primary UEs is at an appropriate ratio to the RoT from the non-primary UEs.

Reference character (b) denotes a state in which overload is created because legacy channels like DCHs are added in the state (a). That is, as the total RoT exceeds the target RoT, overload is created. The Node B can command a rate decrease to the primary UEs by an AG or an RG and to the non-primary UEs by an overload indicator. According to the policies of the Node B scheduler, a rate decrease can be commanded to the primary UEs, the non-primary UEs, or both.

Reference character (c) denotes a state in which allocation of excess radio resources causes overload. If the Node B scheduler transmits an overload indicator to the non-primary UEs, the non-primary UEs have to lower their data rates further, even though they do not greatly affect the Node B. As a result, fairness may be violated between the primary UEs and the non-primary UEs and resources are inefficiently used for the non-primary UEs. Accordingly, it is preferable to decrease the data rates of the primary UEs.

Reference character (d) denotes a state in which overload occurs due to the allocation of too many resources to the non-primary UEs. When the Node B scheduler transmits a rate decrease command to the primary UEs, the primary UEs have to transmit a very small amount of data. The resulting rate imbalance between the primary UEs and the non-primary UEs leads to violation of efficient resource use. In this case, it is preferable to command a rate decrease to the non-primary UEs.

In this context, an exemplary embodiment of the present invention provides a method of transmitting an overload indicator in order to maintain a rate balance between the primary UEs and the non-primary UEs in the states (c) and (d).

Figure 4B:
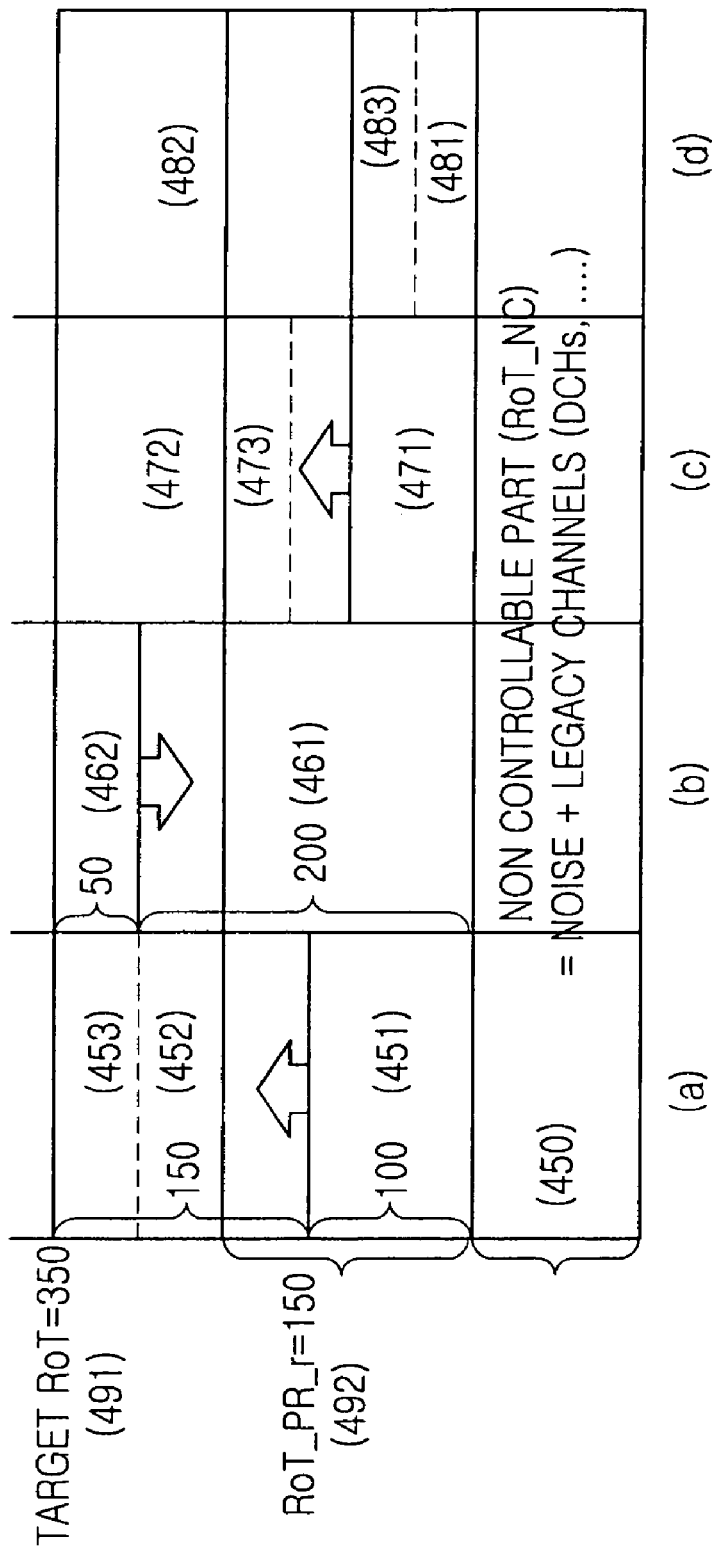
FIG. 4B illustrates an overload indicator transmitting method according to an exemplary embodiment of the present invention.

FIG. 4B illustrates an overload indicator transmitting method according to an exemplary embodiment of the present invention.

Referring to FIG. 4B, a target RoT 491 (RoT_t) denotes a total RoT available for one cell. It is assumed herein that RoT_t=350. Reference numeral 450 denotes a non-controllable RoT (RoT_NC) which is the sum of an RoT from legacy channels such as DCHs and an RoT from noise. Reference numerals 451, 461, 471 and 481 denote power levels (RoT_PR) in use for primary UEs, and reference numerals 452, 462, 472 and 482 denote power levels (RoT_NPR) in use for non-primary UEs. Reference numerals 453, 473 and 483 denote maximum RoT estimates (RoT_PR_est) available to the primary UEs. RoT_PR_est is computed based on the current RoT, data rates, and buffer occupancies of the primary UEs. In order to set an overload indicator to control RoT_NPR, a minimum relative primary RoT 492 (RoT_PR_r) must be set first. RoT_PR_r is a minimum RoT to be allocated to the primary UEs. It is calculated by multiplying a predetermined ratio (PR_ratio_t) by (RoT_t−RoT_NC), that is, a controllable RoT.

For example, the ratio of RoT_PR to RoT_NPR is 60:40 and PR_ratio_t=0.6. Then, RoT_PR_r is 150 by multiplying a controllable RoT 200(=350-100) by 0.6.

In a state (b), RoT_PR 461 is higher than RoT_PR_r 492 and there is no requirement for transmitting an overload indicator. The Node B scheduler schedules the primary UEs by an RG and an AG to match to a target ratio of RoT_PR to RoT_NPR.

In states (a), (c), and (d), the current RoT_PR is lower than the target RoT_PR_r 492.

In the state (a), RoT_PR_est 453 is higher than RoT_PR_r 492. Thus, the Node B decreases RoT_NPR 452 by transmitting an overload indicator to the non-primary UEs. In the state (c), RoT_PR_est 473 is lower than RoT_PR_r 492 but higher than RoT_PR 471. The Node B also decreases the rates of the non-primary UEs by transmitting an overload indicator to the non-primary UEs. On the other hand, in the state (d), both RoT_PR_est 483 and RoT_PR_r 492 are lower than RoT_PR 481. Therefore, even though RoT_NPR 482 is high, there is no requirement for transmitting an overload indicator. Now a description will be made of a method of keeping an RoT_PR ratio and an RoT_NPR ratio constant by transmitting an overload indicator in the cases (a) and (c).

Figure 5:
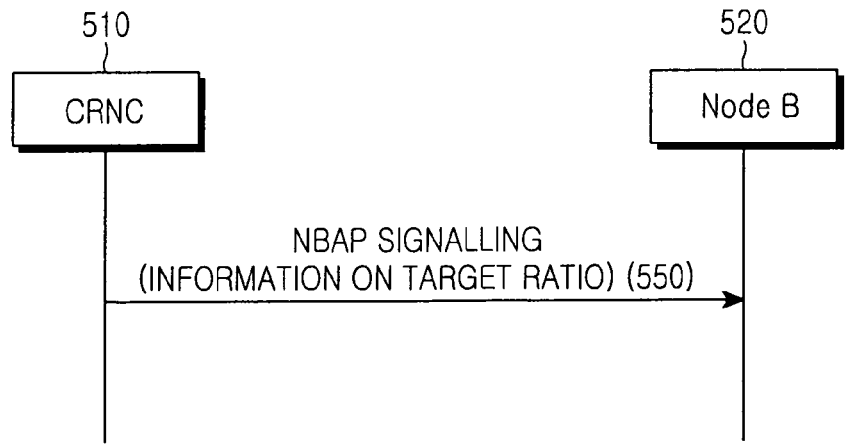
FIG. 5 is a diagram illustrating signaling from a Controlling RNC (CRNC) to a Node B according to an exemplary embodiment of the present invention.

FIG. 5 is a diagram illustrating signaling from a Controlling RNC (CRNC) to a Node B according to an exemplary embodiment of the present invention.

Referring to FIG. 5, a CRNC 510 signals a target RoT_PR ratio (hereinafter, referred to as a target PR ratio) and a target RoT_NPR ratio (hereinafter, referred to as a target NPR ratio) to a Node B 520 by a Node B Application Part (NBAP) message in step 550.

The NBAP message can be a CELL SETUP REQUEST message for an initial cell setup, a CELL RECONFIGURATION REQUEST message for a cell reconfiguration, or one of RADIO LINK SETUP REQUEST, RADIO LINK ADDITION REQUEST, and RADIO LINK RECONFIGURATION REQUEST messages for a radio link configuration, addition or reconfiguration. A COMMON MEASUREMENT INITIATION REQUEST message for common measurement is also available as the NBAP message. Alternatively, a new NBAP message, TARGET RATIO INDICATION can be defined.

Table 1 below illustrates "Choice Information on Target Ratio" included in the NBAP message.

provider over a long term. For example, if neighboring cells 1 and 2 cover a commercial area and a residential area, respectively, more data is transmitted in cell 1 during the day time than at night, and more data is transmitted in cell 2 at night than during the day. Therefore, a target PR ratio for cell 1 is set to 80% for day time and 20% for night, and a target PR ratio for cell 2 is set to 20% for day time and 80% for night.

The PR/NPR ratio transmitter 620 transmits one of the above-described NBAP messages to the Node B. The transmitted NBAP messages include the target PR ratio or the target NPR ratio as illustrated in Table 1.

Figure 7:
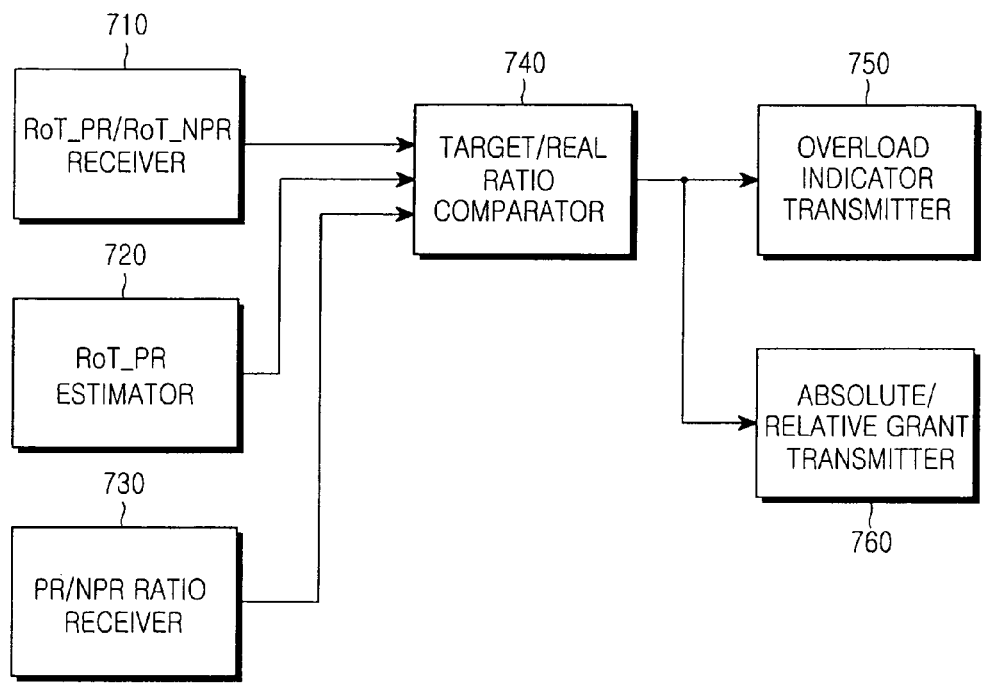
FIG. 7 is a block diagram of the Node B according to an exemplary embodiment of the present invention.

FIG. 7 is a block diagram of the Node B according to an exemplary embodiment of the present invention.

Referring to FIG. 7, the Node B includes an RoT_PR/RoT_NPR decider 710, an ROT_PR estimator 720, a PR/NPR ratio receiver 730, a target/real ratio comparator 740, an overload indicator transmitter 750, and an AG/RG transmitter 760.

The PR/NPR ratio receiver 730 acquires and stores a target PR ratio or a target NPR ratio from an NBAP message received form the CRNC.

The RoT_PR/RoT_NPR decider 710 calculates RoT PR (340 in FIG. 3) and RoT_NPR (350 in FIG. 3), a total RoT, and the RoT of legacy channels in a current cell.

The RoT_PR estimator 720 calculates an RoT estimate (RoT_PR_est) which is a maximum RoT available to primary UEs, based on the amount of data currently received, the buffer occupancies of the primary UEs, and the RoT of the primary UEs.

The target/real ratio comparator 740 receives RoT_PR, RoT_NPR and RoT_PR_est. The target/real ratio comparator 740 calculates a real PR/NPR ratio in the cell, and determines whether overload has been created, whether to control RoT_NPR, and how to schedule in relation to RoT_PR. This determination is made using the real PR/NPR ratio, RoT_PR_est, and the target PR/NPR ratio. The overload creation can be determined by comparing the total RoT and the target RoT of the cell.

The overload indicator transmitter 750 and the AG/RG transmitter 760 transmit scheduling signals to non-primary UEs and primary UEs according to the RoT control method determined by the target/real ratio comparator 740.

TABLE 1

| IE/Group Name | Presence | Range | IE Type and Reference | Semantics Description | Criticality | Assigned Criticality |
|---|---|---|---|---|---|---|
| Choice Information on Target Ratio | M | | | | | |
| >Target PR ratio | | 0 ... 100 | Integer | Target RoT ratio (%) for primary UEs against total controllable RoT. | | |
| >Target NPR ratio | | 0 ... 100 | Integer | Target RoT ratio (%) for non-primary UEs against total controllable RoT. | | |

In Table 1, a Target PR ratio and a Target NPR ratio indicate target RoT ratios (%) for primary UEs and non-primary UEs against a total controllable RoT, respectively. The target ratio of RoT_PR to RoT_NPR can be calculated using the Target PR ratio and the Target NPR ratio.

Figure 6:
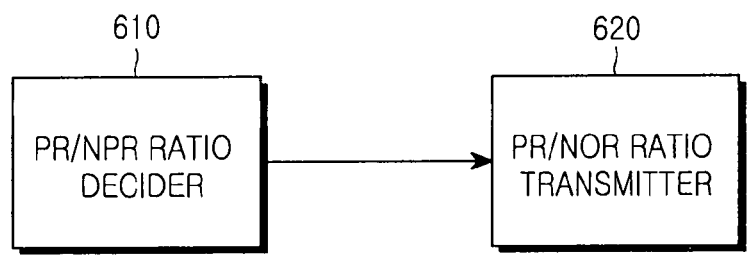
FIG. 6 is a block diagram of the CRNC according to an exemplary embodiment of the present invention.

FIG. 6 is a block diagram of the CRNC according to an exemplary embodiment of the present invention.

Referring to FIG. 6, the CRNC includes a PR/NPR ratio decider 610 and a PR/NPR ratio transmitter 620.

The PR/NPR ratio decider 610 decides on a target PR ratio or a target NPR ratio to be included in an NBAP message, as illustrated in Table 1. These values can be set by a service The PR ratio and the NPR ratio are given by $$PR\_ratio(\%) = RoT\_PR/RoT\_controllable = RoT\_PR/(RpT\_PR + RoT\_NPR) \times 100$$

$$NPR\_ratio(\%) = RoT\_NPR/RoT\_controllable = RoT\_NPR/(RpT\_PR + RoT\_NPR) \times 100 \qquad (2)$$

Figure 1:
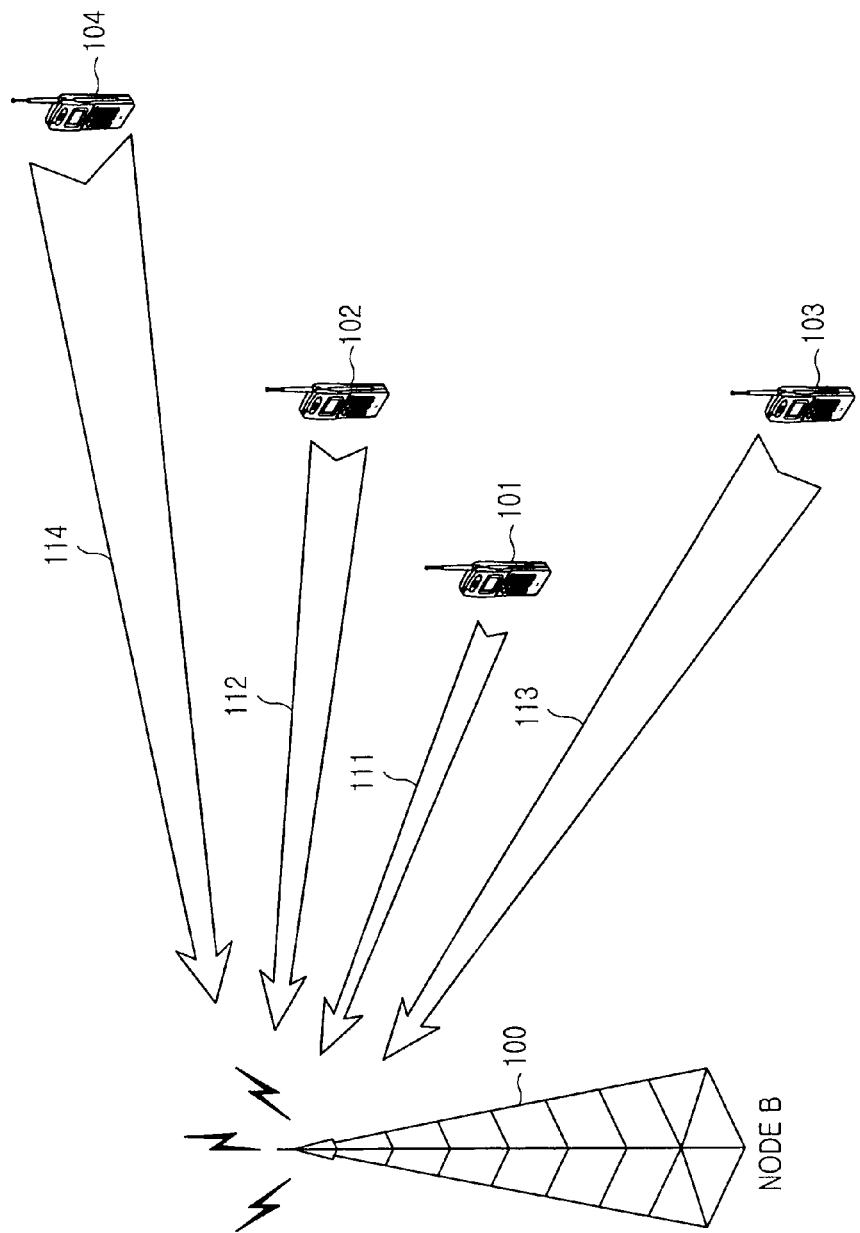
FIG. 1 illustrates the basic principle of E-DCH transmission.
Figure 2:
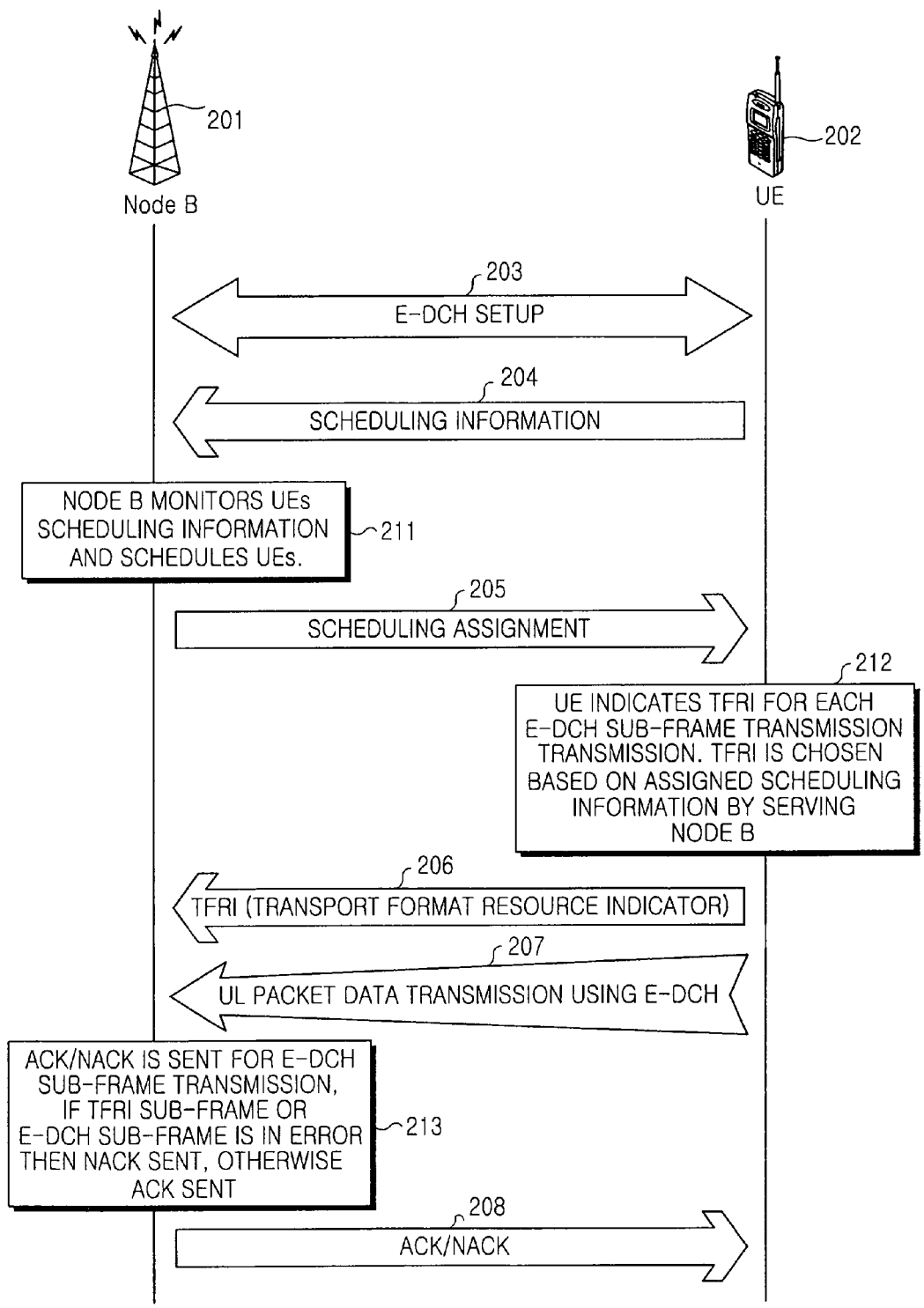
FIG. 2 is a diagram illustrating a signal flow for typical E-DCH transmission and reception.
Figure 3:
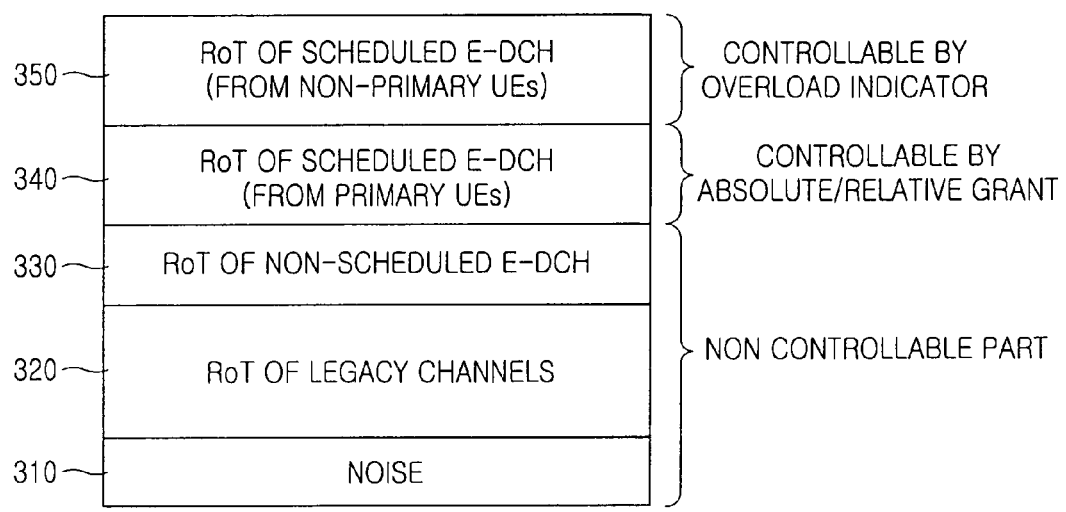
FIG. 3 illustrates the uplink RoT of a cell in a typical SHO.

RoT_PR and RoT_NPR are denoted by 340 and 350 in FIG. 3. The PR_ratio is calculated by dividing the current RoT_PR by the sum of RoT_PR and RoT_NPR, and NPR_ratio is calculated by dividing the current RoT_NPR by the sum of RoT_PR and RoR_NPR.

Figure 8:
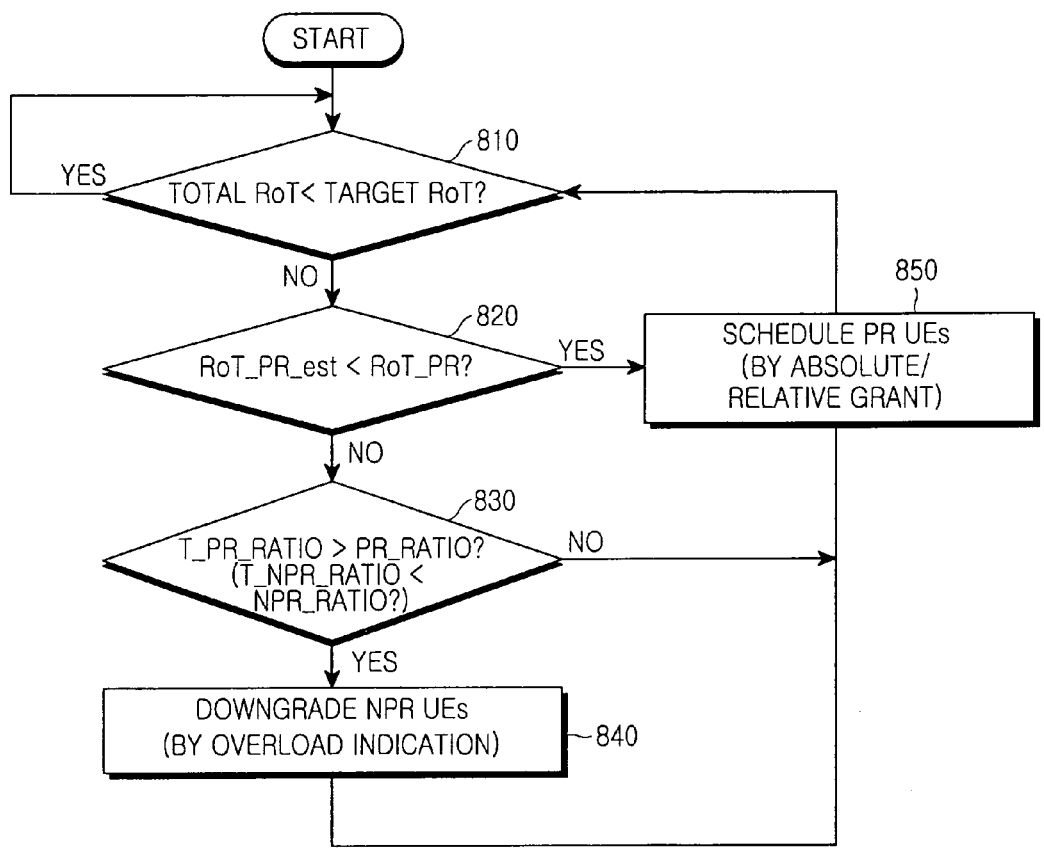
FIG. 8 is a flowchart illustrating an operation of a target/real comparator according to an exemplary embodiment of the present invention.

FIG. 8 is a flowchart illustrating an operation of the target/real comparator 740 according to an exemplary embodiment of the present invention.

Referring to FIG. 8, the Node B compares the total RoT of the current cell with a target RoT signaled by the RNC in step 810. If the total RoT is higher than the target RoT, the Node B proceeds to step 820, determining that overload is created.

In step 820, the Node B compares RoT_PR with RoT_PR_est. If RoT_PR is higher than RoT_PR_est, the Node B schedules primary UE by an AG or an RG without setting an overload indicator in step 850.

If RoT_PR_est is equal to or higher than RoT_PR, the Node B compares PR_ratio/NPR_ratio of the current cell with a target PR/NPR ratio (T_PR_ratio/T_NPR_ratio) acquired from an NBAP message received from the CRNC as illustrated in FIG. 5 in step 830. The PR_ratio and NPR_ratio are calculated by Eq. (2) and RoT_PR and RoT_NPR are calculated by the RoT PR/RoT_NPR decider 710 illustrated in FIG. 7.

If PR_ratio is equal to or higher than the target PR_ratio (T_PR_ratio) or if NPR_ratio is equal to or lower than the target NPR_ratio (T_NPR ratio), the Node B decreases the data rates of the primary UEs to match the real ratio to the target ratio in step 850 and returns to step 810. Alternatively, if the PR_ratio is lower than the T_PR_ratio or if the NPR_ratio is higher than the T_NPR_ratio, the Node B transmits an overload indicator to the non-primary UEs, thereby decreasing their data rates in step 840.

In accordance with an exemplary embodiment of the present invention, when the total RoT of a cell exceeds a target RoT signaled by an RNC, causing overload, a Node B controls the signal strengths of signals from primary UEs and non-primary UEs at predetermined ratios. Therefore, uplink rates are equally allocated between the primary UEs and the non-primary UEs.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of managing radio resources between serving uplink channels from first user equipments (UEs) for which a Node B is a serving Node B and non-serving uplink channels from second UEs for which the Node B is a non-serving Node B in a mobile communication system for transmitting packet data on an enhanced uplink, comprising:

receiving from a radio network controller (RNC), by the node B, a target total power level and a target power ratio of the non-serving uplink channels, and a target total power level on the enhanced uplink;

comparing the target total power level with a current total power level by the Node B;

comparing the target power ratio with a current power ratio by the Node B; and commanding the second UEs to decrease data rate of the non-serving uplink channels, if the current power ratio is higher than the target power ratio and the current total power level is higher than the target total power level by the Node B.

2. The method of claim 1, wherein the receiving comprises the receiving of the target power ratio in a Node B application part (NBAP) message from the RNC.

3. The method of claim 1, further comprising: scheduling the serving uplink channels of the first UEs by the Node B, if the current total power level is at least one of equal to and lower than the target total power level.

4. The method of claim 3, wherein the commanding of the first UEs comprises the signaling of a data rate for the serving uplink channels by at least one of an absolute grant and a relative grant.

5. A method of managing radio resources between serving uplink channels from first user equipments (UEs) for which a Node B is a serving Node B and non-serving uplink channels from second UEs for which the Node B is a non-serving Node B in a mobile communication system for transmitting packet data on an enhanced uplink, comprising:

setting a target total power level by a radio network controller (RNC);

setting a target power ratio for the non-serving uplink channels and a target total power level on the enhanced uplink by the RNC; and signaling the target total power level and the target power ratio to the Node B by the RNC, for use in controlling a data rate of the non-serving uplink channels for the second UEs.

6. The method of claim 5, further comprising: receiving the target total power level and the target power ratio of the non-serving uplink channels from the RNC by the Node B;

comparing the target total power level with a current total power level by the Node B;

comparing the target power ratio with a current power ratio by the Node B; and commanding the second UEs to decrease data rate, if the current power ratio is higher than the target power ratio and the current total power level is higher than the target total power level by the Node B.

7. The method of claim 6, wherein the signaling comprises signaling the target power ratio to the Node B in a Node B application part (NBAP) message.

8. The method of claim 6, further comprising: scheduling the serving uplink channels of the first UEs by the Node B, if the current total power level is at least one of equal to and lower than the target total power level.

9. The method of claim 8, wherein: commanding the first UEs comprises signaling a data rate for the serving uplink channels by at least one of an absolute grant and a relative grant.

10. A Node B apparatus for managing radio resources between a serving uplink channels from first user equipments (UEs) for which a Node B is a serving Node B and non-serving uplink channels from second UEs for which the Node B is a non-serving Node B in a mobile communication system for transmitting packet data on an enhanced uplink, comprising:

a receiver for receiving from a radio network controller (RNC), by the Node B, a target total power level and a target power ratio of the non-serving uplink channels, and a target total power level on an enhanced uplink;

a decider for determining to command the second UEs to decrease data rate of the non-serving uplink channels, if a current total power level is higher than the target total power level and the current power ratio is higher than the target power ratio; and a transmitter for commanding the second UEs to decrease data rate of the non-serving uplink channels according to the determination of the decider.

11. The Node B apparatus of claim 10, wherein the decider outputs a signal for scheduling the serving uplink channels of the first UEs, if the current total power level is at least one of equal to and lower than the target total power level.

12. The Node B apparatus of claim 11, further comprising scheduling of the serving uplink channels of the first UEs is performed by at least one of an absolute grant and a relative grant.

13. The Node B apparatus of claim 10, further comprising an estimator for estimating the current total power level and the current power ratio.

14. The apparatus of claim 10, wherein the receiver receives the target power ration in a Node B application part (NBAP) message from the RNC.

* * * * *

UNITED STATES PATENT AND TRADEMARK OFFICE
CERTIFICATE OF CORRECTION

PATENT NO. : 7,643,844 B2  Page 1 of 1
APPLICATION NO. : 11/393844
DATED : January 5, 2010
INVENTOR(S) : Kwak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 841 days.

Signed and Sealed this

Sixteenth Day of November, 2010

David J. Kappos
*Director of the United States Patent and Trademark Office*